United States Patent
Dobler et al.

(10) Patent No.: US 7,109,854 B2
(45) Date of Patent: Sep. 19, 2006

(54) COLLISION PREVENTION SYSTEM FOR VEHICLES

(75) Inventors: Guenter Dobler, Albach (DE); Holger Enigk, Rangsdorf (DE); Hartmut Marwitz, Esslingen (DE); Siegfried Rothe, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 72 days.

(21) Appl. No.: 10/477,248

(22) PCT Filed: May 4, 2002

(86) PCT No.: PCT/EP02/04918

§ 371 (c)(1),
(2), (4) Date: Nov. 10, 2003

(87) PCT Pub. No.: WO03/001471

PCT Pub. Date: Jan. 3, 2003

(65) Prior Publication Data

US 2004/0181338 A1    Sep. 16, 2004

(30) Foreign Application Priority Data

May 8, 2001    (DE)    ................. 101 28 792

(51) Int. Cl.
- *B60Q 1/00* (2006.01)
- *B60T 7/12* (2006.01)
- *G06F 17/10* (2006.01)
- *G06G 7/78* (2006.01)
- *G08G 1/16* (2006.01)

(52) U.S. Cl. .................. 340/435; 340/436; 701/96; 701/301

(58) Field of Classification Search ........ 340/435–437, 340/431; 701/96, 301; 280/274–285
See application file for complete search history.

(56) References Cited

U.S. PATENT DOCUMENTS 5,602,542 A    2/1997    Widmann (Continued)

FOREIGN PATENT DOCUMENTS

EP    0 626 655 A    11/1994

*Primary Examiner*—Daniel Wu
*Assistant Examiner*—Jennifer Mehmood
(74) *Attorney, Agent, or Firm*—Akerman Senterfitt; Stephan A. Pendorf

(57) ABSTRACT

The invention relates to a system for preventing collisions of an automobile with obstacles. Sensors mounted in the automobile detect the area surrounding the vehicle. The signals of said sensors are evaluated by a data processing device in order to calculate the available obstacle-free driving space. Other sensors additionally detect the position of all movable vehicle parts (e.g. a trailer) and the dynamic parameters of the current driving situation (e.g. speed, steering angle, etc.). Based on said data, the driving speed required during the following time intervals in order to continue driving is calculated in advance by the data processing device and compared with the actually available obstacle-free driving space that has been detected. Said comparison provides early forecast regarding a possible collision. The driver is warned of a possible collision danger by corresponding warning devices and can consequently react in time. In critical situations (e.g. high driving speed), direct interventions in the control of the vehicle by the data processing device can take place to assist the driver.

20 Claims, 4 Drawing Sheets

U.S. PATENT DOCUMENTS 6,553,130 B1 * 4/2003 Lemelson et al. .......... 382/104
6,567,737 B1 * 5/2003 Nakamura et al. ............ 701/96
6,614,387 B1 * 9/2003 Deadman ..................... 342/70
6,794,987 B1 * 9/2004 Schiffmann et al. ........ 340/435

* cited by examiner

COLLISION PREVENTION SYSTEM FOR VEHICLES

CROSSREFERENCE TO RELATED APPLICATION

This application claims the benefit of PCT/EP02/04918 filed on May 4, 2002 and German patent application 101287925 filed on May 8, 2001.

BACKGROUND OF THE INVENTION

1. Field of the Invention

The invention is concerned with the field of automotive engineering. In particular, the invention relates to safety systems for preventing collisions.

2. Description of the Related Art

Such systems are specifically significant for vehicles which are less easy to steer into critical situations owing to their size, their weight and to a certain extent complex design (for example, a plurality of axles, trailers, containers, etc.).

These vehicles are, for example, trucks (rigid vehicles, semitrailers and trailer vehicles), buses, articulated vehicles and other vehicles (for example recreational trailers), in which the problem arises that existing overhangs in various regions of the vehicle (rear, front, corner edges and superstructures) swing out when turning and maneuvering. In addition, depending on the type of vehicle, a plurality of regions of the vehicle cannot usually be satisfactorily seen from the driver's position so that owing to "dead angles" the driver is frequently unable to monitor swinging out—for example by looking in the mirror—and notice, for example, during a maneuver, when such regions of the vehicle are coming too close to obstacles, and react appropriately. As a result, in tight driving situations there is a risk of colliding with obstacles and other road users, which may result in serious injury to persons and severe damage to property.

Typical situations in which the described problems occur are presented below:

a) Risk of Collisions in the Front Region

In particular, vehicles with a large front overhang (distance between front axle and the front of the vehicle) swing out a very long way when turning or maneuvering and must also move out to a great extent in very narrow streets. As a result, the front of the vehicle moves over a correspondingly large radius, and in particular side regions of the front can quickly impact against obstacles (see FIG. 1). Even when reversing in order to park or performing reversing maneuvers, the front of the vehicle moves in a circular arc shape (locked front wheels) so that there is also the risk of side regions of the front being involved in a collision (see FIG. 2). This risk is increased further as when reversing the main attention of the driver is of course directed at the rear region of the vehicle in accordance with the direction of travel.

b) Risks of Collisions in the Rear Region

In a corresponding way, in the case of vehicles with a large overhang at the rear (distance between the rear axle and rear), there is a risk of collision specifically of the side regions of the rear both when performing maneuvers moving forward and when performing reversing maneuvers (see FIGS. 3 and 4). In particular in the case of vehicles with trailers, semi-trailers or superstructures (for example a vehicle-mounted rotational crane) these risks of collision are particularly pronounced.

c) Risks of Collision with Attached Trailers, Semi-Trailers, etc.

Specific problems arise in vehicles with trailers, semi-trailers or superstructures. In such vehicles, the front of the attached part of the vehicle swings out in the form of an arc when turning or maneuvering in the forward direction and reverse direction so that there is a risk of collision in critical driving situations (see FIGS. 5, 6, 7).

d) Risk of Collision of the Side Regions of a Vehicle

The side regions of a (relatively long) vehicle can also collide with obstacles in a small maneuvering space (see FIGS. 8 and 9).

The situations described show that the problems of preventing collisions as comprehensively as possible are relatively complex. Systems in which distance messages are issued are known. In such systems, the critical regions of a vehicle are monitored by devices (for example ultrasonic sensors, video cameras) which sense when obstacles are approached. When a predefined distance from the obstacle is undershot, the driver is warned, for example, by means of optical or audible signals. However, these systems can detect obstacles and distances in good time only in simple driving situations. For this reason, owing to the vehicle's own movement, warnings are issued too late (or incorrectly) so that as a result of the, under certain circumstances, high chronological dynamics of the driving situation, there is hardly the possibility any more for the driver to react appropriately in good time.

In WO 03/001471 a system is described for avoiding collisions between vehicles and obstacles. Therein the spatial environment of the automobile is surveyed via vehicle sensors and the data derived therefrom is supplied to a data processing unit for computing the area free of obstacles. Other sensors are supplementally used to sense the orientation and position of all moveable vehicle components, as well as dynamic parameters of the instantaneous driving condition. From these data, in the data processing unit the space required for the next time interval of continuation of the vehicle travel is calculated in advance and compared with the actual existing obstacle conditions. This comparison provides an early prediction of a possible collision. In critical situations it is possible, as an aid to the vehicle operator, to make direct input to the vehicle controls via the data processing unit.

U.S. Pat. 5,602,542 A1 describes a system for assisting vehicle operators during the parking process. By using ultrasonic sensors in the vehicle chassis, a distance profile relative to the vehicle body, and of the objects lying closest thereto, is produced. Therein, the contour of the vehicle body is stored in a memory unit. In a similarly organized memory the distancing profile is recorded. In this manner, by the direct comparison of the memory contents with the aid of a microprocessor, the relative distance between the vehicle body and an object in the environment can be continuously determined during parking of the vehicle.

SUMMARY OF THE INVENTION

The invention takes this prior art as a starting point. It is based on the object of developing an improved system for preventing vehicles from colliding with obstacles.

This object is achieved by means of the method as claimed in claim 1 and the apparatus for carrying out the method having the features of claim 8. Further details and advantageous refinements emerge from the subclaims.

BRIEF DESCRIPTION OF THE DRAWINGS

In the following the invention will be described in greater detail on the basis of an exemplary construction of an inventive device.

DETAILED DESCRIPTION OF THE INVENTION

The system according to the invention for preventing collisions detects situation parameters which are different at a particular time so that the risk of a collision can be sensed in good time. On the basis of this, collision-preventing measures are then taken. The operation of the system can be divided here into individual regions:

a) Determination of the Required Driving Space

Figure 1:
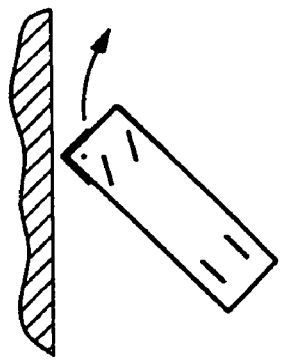
FIG. 1 shows vehicles with a large front overhang (distance between front axle and the front of the vehicle) swing out a very long way when turning or maneuvering and must also move out to a great extent in very narrow streets. As a result, the front of the vehicle moves over a correspondingly large radius, and in particular side regions of the front can quickly impact against obstacles (see FIG. 1).
Figure 2:
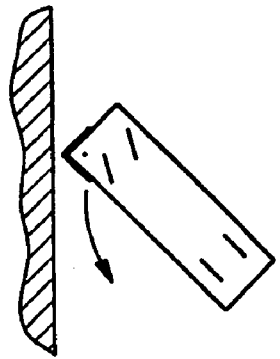
FIG. 2 shows even when reversing in order to park or performing reversing maneuvers, the front of the vehicle moves in a circular arc shape (locked front wheels) so that there is also the risk of side regions of the front being involved in a collision (see FIG. 2). This risk is increased further as when reversing the main attention of the driver is of course directed at the rear region of the vehicle in accordance with the direction of travel.
Figure 3:
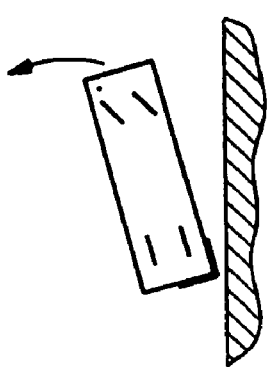
FIGS. 3 and 4 show in a corresponding way, in the case of vehicles with a large overhang at the rear (distance between the rear axle and rear), there is a risk of collision specifically of the side regions of the rear both when performing maneuvers moving forward and when performing reversing maneuvers (see figs 3 and 4). In particular in the case of vehicles with trailers, semi-trailers or superstructures (for example a vehicle-mounted rotational crane) these risks of collision are particularly pronounced.
Figure 4:
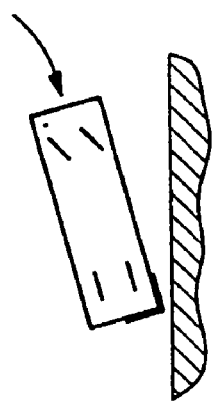
Figure 5:
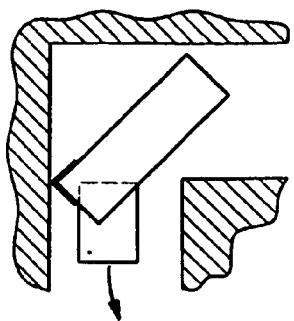
FIGS. 5, 6 and 7 show specific problems arise in vehicles with trailers, semi-trailers or superstructures. In such vehicles, the front of the attached part of the vehicle swings out in the form of an arc when turning or maneuvering in the forward direction and reverse direction so that there is a risk of collision in critical driving situations (see figs 5, 6, 7)
Figure 6:
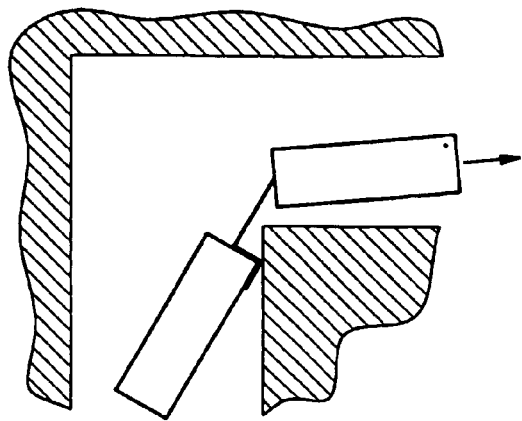
Figure 7:
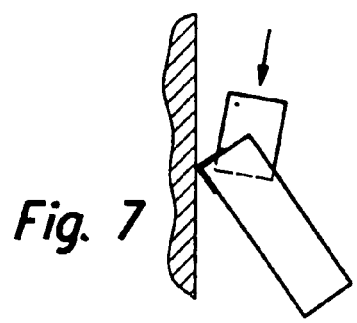
Figure 8:
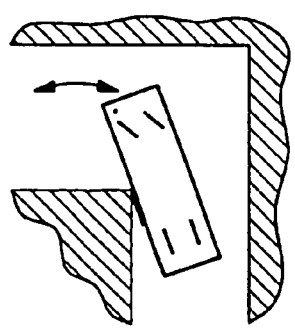
FIGS. 8 and 9 show the side regions of a (relatively long) vehicle can also collide with obstacles in a small maneuvering space (see figs 8 and 9).
Figure 9:
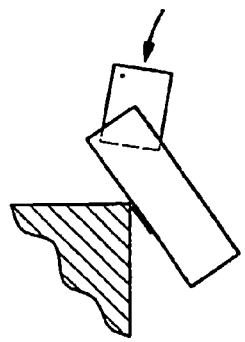
Figure 10:
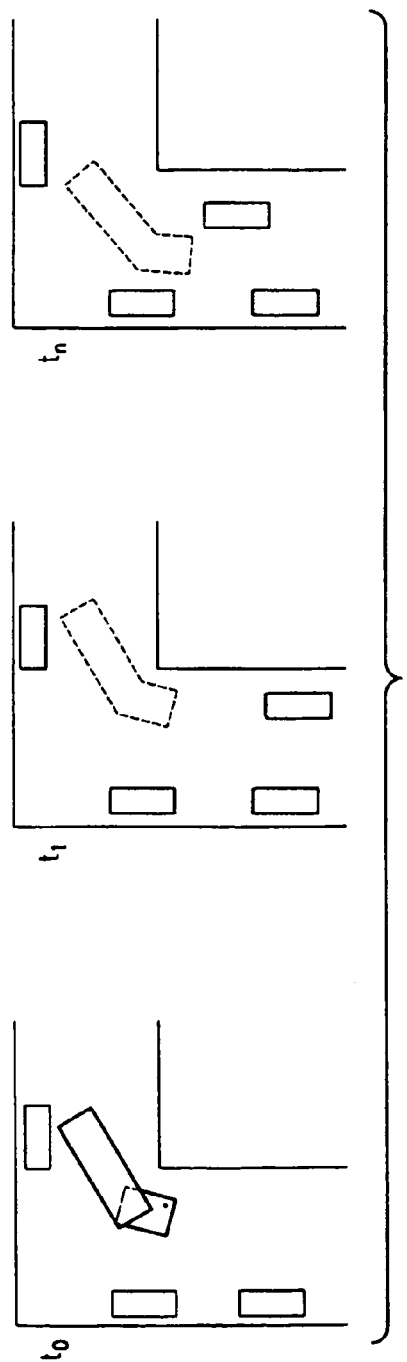
FIG. 10 shows schematic views of the required driving space using the example of a tight bend in a chronological sequence ($t_0$, $t_1$, $t_n$).

A significant component of the system is to determine the required driving space, which differs depending on the maneuver. The required driving space is the volume in space which is "passed through" in chronological succession as the vehicle travels. This includes, in particular, also the space which is required when turning and maneuvering as a result of the swinging out of overhangs. FIG. 10 shows in schematic exemplary form the spatial positions of a truck at the times $t_0$, $t_1$, $t_n$ while going through a tight bend. By incrementally superimposing the chronological sequence of the positions it is thus possible to illustrate the total driving space required for the driving maneuver.

In order to avoid collisions, the system according to the invention determines sections of the required driving space chronologically in advance from various data items by calculation in a data processing device (computer, microprocessor).

These data items are, on the one hand, the dimensions of the vehicle including the dimensions of further parts of the vehicle, such as trailer, semitrailer, superstructures, etc. In addition to the size information there are structural details (position of axles, position of the support point, etc. of the trailer coupling, etc.) as these also determine the moving out of parts of the vehicle.

In addition to these (generally constant) values, information relating to the instantaneous position of moving parts of a vehicle (steering angle, angle between the trailer and traction engine, etc.) which changes during the journey and therefore has to be continuously updated is required. In order to acquire this data, appropriate sensors (measuring sensors, position pickups, etc.) have to be present on the vehicle and their signals have to be passed on to the data processing device.

An essential factor for preventing a collision is to calculate in advance as precisely as possible the driving space which is required in future (for further travel). For this purpose, in addition to the aforesaid data, various dynamic values of the driving situation (speed, shifting of gear speed, engine speed, brake values, etc.) also have to be acquired and included in the calculations. For the continuous sensing of these dynamic values, appropriate sensors whose data is transferred to the data processing device are necessary.

The required driving space which is taken up by the vehicle (including parts of the vehicle) when the travel continues is then calculated as a function of all this data.

b) Determination of the Existing Driving Space

Figure 11:
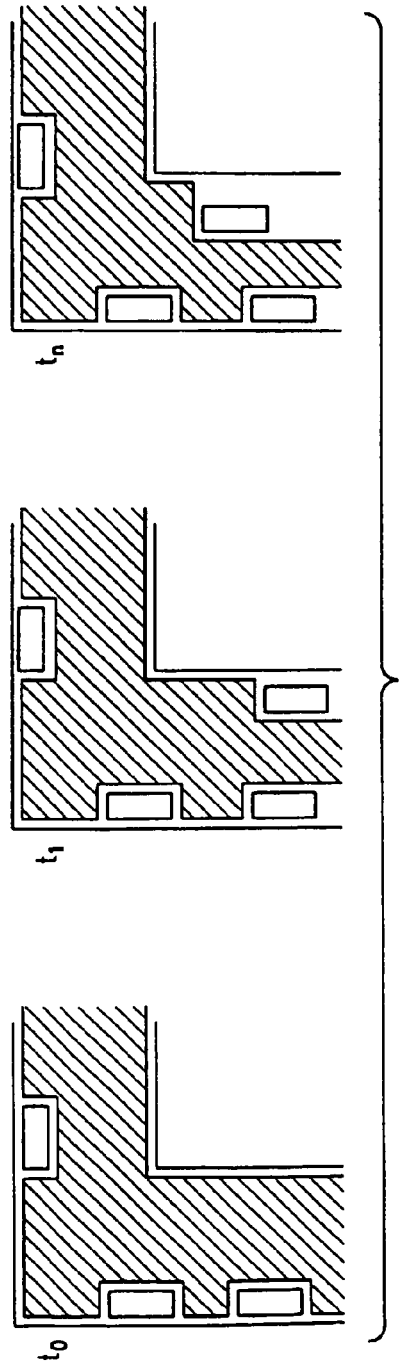
FIG. 11 is an illustration of the existing driving space of the same situation according to FIG. 10.
Figure 12:
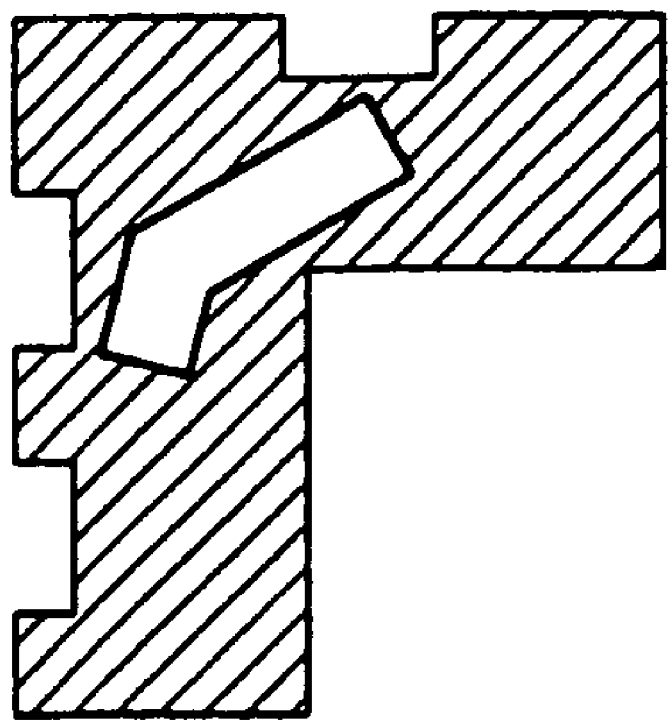
FIG. 12 shows a comparison of the required driving space and existing driving space in accordance with the driving situation at the time $t_1$ (according to FIG. 10).

The existing driving space is a spatial region without obstacles which is available for the vehicle to travel safely without collisions. This driving space is generally determined by the road profile and is additionally restricted by immovable obstacles (road boundaries, trees, houses, parked vehicles, etc.), and on the other hand is changed by moving obstacles and road users (vehicles, pedestrians, etc.). Depending on the events on the road, the existing driving space changes here more or less dynamically. FIG. 11 shows this situation of an existing driving space which changes over time ($t_0$, $t_1$, $t_n$).

In order to prevent collisions, the dimensions of the existing driving space must be determined and included in calculations of the data processing device. For this purpose, initially the spatial surroundings of the vehicle have to be sensed. Various means are used for this, for example, GPS (Global Positioning System), digital maps (stored in the data record of the data processing device or capable of being retrieved by a wire-free connection to fixed computers), optical and other radiation sensors (visible light, infrared, radar), distance and movement sensors (for example ultrasonic sound, laser, etc.). In conjunction with video cameras, it is also possible to use modern techniques for recognizing images (computer evaluation of video signals for recognizing objects) in order to identify obstacles. For complex sensing of surroundings as precisely as possible, a plurality of the specified means are preferably combined here. The data which is supplied by these devices is transmitted to the data processing device and evaluated there in order to calculate the dimensions of the existing driving space. Thus, a virtual image can be created, for example as a grid model of the existing driving space.

As, on the one hand, the position of the existing driving space changes continuously whenever the vehicle itself moves, and on the other hand the dimensions can also change as a result of moving obstacles, this calculation of the existing driving space has to be continuously updated. Depending on the current speed of the driver's own vehicle but also of other moving obstacles (for example oncoming passenger cars), it may be necessary for the time interval $t_1-t_0$ between two successive occasions when the changing existing driving space is sensed to be in the region of a fraction of a second.

c) Predicting Collisions by Comparison of Required Driving Space and Existing Driving Space In order to detect at an early point an imminent collision, a comparison is carried out between the previously calculated required driving space and the existing driving space which is actually sensed at a given time. This comparison is carried out by means of corresponding calculations by the data processing device. If the required driving space which is calculated in advance exceeds the limits of the existing driving space there is a risk of a collision, that is to say whenever the vehicle (including parts of the vehicle such as trailers, etc.) is in the process of leaving the existing driving space if the journey continues without change.

As the driving situation (position of the vehicle, moving obstacles, etc.) changes continuously, these comparison calculations over time $(t_0, t_1, \ldots t_n)$ are repeated continuously with updated data relating to the existing driving space or required driving space. Ideally, continuous monitoring for a collision is carried out during the entire journey.

As numerous measurement processes during which inaccuracies may also occur, are carried out by means of a number of different sensors in order to sense both the required driving space and the existing driving space, it is necessary to carry out the collision forecasting calculated from this data with safety regions relating to the spatial conditions and their change over time. For example, the required driving space which is calculated in advance can be enlarged with safety distances and/or the sensed existing driving space can be correspondingly reduced. Depending on the dynamic development of the driving situation (locomotion of the driver's own vehicle, changes in position of other road users) these safety distances can also be adapted dynamically.

All the necessary calculations can be carried out in the vehicle itself by means of an appropriately powerful on-board data processing device. Alternatively, the signals of the detectors and sensors which are located on the vehicle can be transmitted for calculation purposes via a wire-free connection to a fixed data processing system and after evaluation there the results can be transmitted back to the vehicle where the corresponding reaction is then triggered. A combined system is also possible in which a first data processing system in the vehicle is connected in wire-free fashion to a fixed data processing system.

d) Preventing Collisions

If there is a risk of collision, the system carries out a series of measures according to an incremental catalog of measures. If there is sufficient time to prevent the collision through customary driving maneuvers, warning signals which cause the driver to intervene are appropriate at first. These warning signals may be issued audibly (striking sounds/tones but also through voice outputs, in which case specific instructions, for example relating to the place on the vehicle in question or else action recommendations are also possible), optically (for example, by means of light), visually (for example, by means of graphic representations of the vehicle and the obstacle on appropriate displays), or else haptically (for example, a vibration, shaking of the steering wheel). If the remaining time is not sufficient for an appropriate reaction by the driver, the system brings about a direct intervention in the control of the vehicle, for example, emergency braking or counter-steering of the vehicle in order to return to the existing driving space. Furthermore, the size of the required space may be reduced by automatically reducing the contours of the vehicle (for example, folding in the side mirrors, retracting the antennas, lowering spoilers, etc.; changing the ride control, in order to reduce the height of the vehicle before an underpass/bridge or in order to increase the floor clearance; adjusting the superstructures and overhangs, for example retracting the tailgate, turning crane superstructures at bends, adjusting the length of the drawbar).

The system according to the invention provides a high degree of reliability in preventing collisions as not only the current distance values between parts of the vehicle and obstacles is taken into account, but also dynamic changes are sensed and used for a calculation in advance so that a collision warning can be issued before critical distances are reached in the first place. This early warning generally permits collisions to be prevented through normal driving maneuvers, i.e. inter-ventions by the driver may be made without excessively hasty actions during which there is always the risk of an incorrect reaction (elimination of the so-called reaction time).

In addition to this important aspect of a relatively early warning indication, the system according to the invention can additionally provide the driver with valuable information (for example anticipated location of a collision, current distance from the obstacle, remaining time, etc.), which significantly reduces the reaction time further as the driver can intervene directly in an entirely targeted fashion. This support is particularly advantageous in unclear situations (unfavorable light conditions, for example due to fog, driving area with poor visibility, high traffic volume, etc.) in which the potential risk of a collision is correspondingly high. As not only the driver's own changes in position are taken into account, but also the continued movement of other road users is detected, it is possible, for example, even to detect an imminent collision which is not brought about by the driver's own movement (under certain circumstances even in a stationary state) but rather for example as a result of another vehicle approaching.

In addition to the described warning and notification function, the system can be configured in such a way that it actively supports the driver in making difficult maneuvers (narrow course of a road, bridges, and the like). Such help may consist, for example, in the fact that movable parts of a vehicle which are at risk of a collision are automatically removed (swung away, folded in, lowered, etc.) from the area of risk during maneuvering by the system intervening. The driver is thus largely relieved of the need to perform these various actuation processes. Wider-ranging interventions in order to provide support in carrying out maneuvers in spatially restricted conditions are also possible. For example, given an appropriate configuration the system can, for example, actively change the maneuvering properties of the vehicle (ride control, adjustment of the length of the drawbar, etc.).

In one preferred embodiment to the system according to the invention, the system intervenes directly in the control of the vehicle (steering, brake etc.) in driving situations with critical timing. This provides additional security in situations in which human reaction times are no longer sufficient.

The described system for preventing collisions provides the advantage that it can relatively easily be adapted to changes, for example, in the contours of a vehicle (for example new trailer, different superstructures etc.). Such changes can be incorporated into the system without a large degree of technical expenditure in that the corresponding data relating to the new dimensions is simply input into the memory of the (mobile and/or fixed) data processing system. Given an appropriate embodiment, this can also be carried out, for example, in a wire-free fashion. If there are frequently repeated (identical) changes (for example, traveling with a loaded or unloaded container), a plurality of different contours or dimensions of the vehicle may also be contained in the memory of the data processing system and retrieved.

The system according to the invention is defined by a large field of use as it is suitable for a very large range of types of vehicle for preventing collisions: for example passenger cars with recreational trailers, articulated trucks, construction site vehicles (concrete mixers, vehicle-mounted cranes, excavator transporters) as well as agricultural vehicles and other utility vehicles.

The invention claimed is:

1. A method far preventing a vehicle colliding with obstacles, comprising
   (a) calculating in a first step the driving space required for maneuvering of the vehicle by entering into a memory associated with a computer the current dimensions, configuration, and turning characteristics of the vehicle including any structure carried on the vehicle and trailer connected to the vehicle, wherein more than one configuration of the vehicle is pre-programmed into said memory and available for recall,
   (b) continuously updating the required driving space using sensors associated with at least one of steering wheel position, vehicle carried structure position, and trailer angle relative to the vehicle,
   (c) sensing in three dimensions the distance between the vehicle and both fixed and moving obstacles in the vehicle's surroundings,
   (d) creating in the computer a model of the available driving space based on the product of step (a) and (b) as well as stored or sensed road information and the sensed distance values to fixed and moving obstacles from step (c),
   (e) sensing instantaneous values relating to the movement, including at least one of speed, direction of travel, and acceleration/deceleration of the vehicle,
   (f) calculating, from the product of steps (a)—(e), the driving space required to continue safe movement of the vehicle,
   (g) carrying out a comparison between the existing driving space as determined in steps (a) and (b) and the required driving space calculated in step (f), and
   (h) initiating via the computer measures for preventing collisions when the required driving space extends beyond the existing driving space.

2. The method according to claim 1, further comprising transmitting the values of the dimensions of the vehicle in wire-free fashion into the memory of the computer.

3. The method according to claim 1, wherein in addition to the dimensions of the vehicle, features which influence driving characteristics, including at least one of turning radius, swinging out of projecting or towed pans, including at least one of the position of the axles within the vehicle and the position and length of a drawbar are included in the calculation of the required driving space.

4. The method according to claim 1, wherein in the case of moving vehicle pans information relating to the current position of these vehicle parts is included in the calculation of the required driving space.

5. The method according to claim 1, wherein the required driving space and existing driving space are calculated at time intervals ($t_0$, $t_j$, $t_2$, . . . ), these intervals following one another in such brief succession that changes to the existing driving space and of the required driving space are sensed with appropriate speed so that measures initiated when there is a risk of collision are designed to prevent a collision.

6. The method according to claim 1, wherein a spatial margin of safety between the vehicle and obstacles is included by at least one of correspondingly reduced dimensions of the existing driving space and enlarged dimensions of the required driving space are used to carry out the comparison.

7. The method according to claim 1, wherein the measures initiated to prevent collisions include at least one of:
   triggering of warning signals,
   changing the dimensions of the vehicle,
   changing the maneuverability of the vehicle, and
   intervening in the control of the vehicle.

8. The method according to claim 1, wherein the measures for preventing collisions are initiated in a sequence which is determined by the time remaining prior to a collision.

9. An apparatus for carrying out a method for preventing a vehicle colliding with obstacles, the method including the steps 0f
   (a) calculating in a first step the driving space required for maneuvering of the vehicle by entering into a memory associated wit a computer the current dimensions, configuration, and turning characteristics of the vehicle including any structure carried on the vehicle and trailer connected to the vehicle, wherein more than one configuration of the vehicle is pre-programmed into said memory and available for recall,
   (b) continuously updating the required driving space using sensors associated with at least one of steering wheel position, vehicle carried structure positionig, and trailer angle relative to the vehicle,
   (c) sensing in three dimensions the distance between the vehicle and both fixed and moving obstacles in the vehicle's surroundings,
   (d) creating in the computer a model of the available driving space based on the product of step (a) and (b) as well as stored or sensed road information and the sensed distance values to fixed and moving obstacLes from step (c),
   (e) sensing instantaneous values relating to the movement, including at least one of speed, direction of travel, and acceleration/deceleration of the vehicle,
   (f) calculating, from the product of steps (a)—(e), the driving space required to continue safe movement of the vehicle,
   (g) carrying out a comparison between the existing driving space as determined in steps (a) and (b) and the required driving space calculated in step (f), and
   (h) initiating via the computer measures for preventing collisions when the required driving space extends beyond the existing driving space, the apparatus comprising:

a memory for storing values of dimensions of the vehicle, and for storing a plurality of different vehicle contours or configurations, means for sensing distance values between vehicle components and obstacles in surroundings of the vehicle, means for sensing movement parameters of die vehicle, including at least one of speed, direction of travel and acceleration/deceleration of the vehicle, a data processing system for calculating an existing driving space from the distance values, means for additionally calculating, from the movement parameters in conjunction with the values of the dimensions of the vehicle, a driving space which is required to continue driving, and means for carrying our a comparison between the existing driving space and the required driving space, and mechanism for being actuated by the data processing system in order to prevent a collision when the calculated required driving space expands beyond the existing driving space wherein the data processing system is associated with the memory.

10. The apparatus according to claim 9, further comprises a communications unit for transferring the values of the dimensions of the vehicle can be transferred into the memory of the data processing system in a wire-free fashion.

11. The apparatus according to claim 9, wherein the data processing system also includes, in the calculation of the required driving space, information relating to the structural properties of the vehicle, which also determine a driving behavior of the vehicle.

12. The apparatus according to claim 9, further comprises means which, in the case of moving pans of the vehicle, sense a current position of these parts of the vehicle vehicles and these values are included in the calculation of the required driving space by the data processing system.

13. The apparatus according to claim 9, wherein the data processing System determines the required driving space and the existing driving space at time intervals ($t_0, t_1, t_2, \ldots$) which follow one another in such short succession that changes to the existing driving space and to the required driving space are sensed with appropriate timeliness so that the devices mechanism for preventing a collision is actuated by the data processing system at such an early time that a collision is prevented.

14. The apparatus according to claim 9, wherein a spatial safety distance between the vehicle and obstacles is included by virtue of the fact that, before the comparison is carried out, the data processing system at least one of reduces the dimensions of the existing driving space by computational means or increases the dimensions of the required driving space.

15. The apparatus according to claim 9, wherein the mechanism for preventing a collision includes at least one of:

means for triggering warning signals means for changing the dimensions of the vehicle means for changing the maneuverability of the vehicle means for intervening in the control of the vehicle.

16. The apparatus according to claim 9, wherein the mechanism for preventing a collision is prioritized by the data processing system and carried out in a sequence which is determined by the time remaining prior to a collision.

17. The apparatus according to claim 9, wherein the means for sensing distance values between parts of a vehicle and obstacles are embodied as optical or audible, distance measuring sensors or as radiation sensors or as video cameras or as electronic devices for determining position or environment.

18. The apparatus according to claim 9, wherein the data processing system is carried in the vehicle as a mobile system.

19. The apparatus according to claim 9, wherein the vehicle is connected to a stationary data processing system via a wire-free connection.

20. The method according to claim 1, wherein the values of the dimensions of the vehicle are read out of a memory, which is configured for simultaneously storing a plurality of different vehicle contours.

* * * * *